United States Patent [19]
House

[11] Patent Number: 5,791,468
[45] Date of Patent: Aug. 11, 1998

[54] PAPERBOARD COMPACT DISK PACKAGE

[75] Inventor: Richard F. House, St. Charles, Ill.

[73] Assignee: Arthur Meyer, Carson City, Nev.

[21] Appl. No.: 936,871

[22] Filed: Sep. 25, 1997

[51] Int. Cl.$^6$ ................................................ B65B 85/57
[52] U.S. Cl. ........................................ 206/308.1; 206/313
[58] Field of Search ............................ 206/308.1, 307.1, 206/309, 310, 311, 312, 313, 775, 776, 777, 783

[56] References Cited

U.S. PATENT DOCUMENTS

| | | |
|---|---|---|
| 821,019 | 5/1906 | Cooke, Jr. |
| 881,078 | 3/1908 | Johnson |
| 1,600,999 | 9/1926 | Sea |
| 2,145,500 | 1/1939 | Townsend |
| 3,369,732 | 2/1968 | Hanson |
| 3,507,444 | 4/1970 | Werby |
| 3,561,671 | 2/1971 | Minot, Jr. |
| 4,289,235 | 9/1981 | Egly |
| 4,511,034 | 4/1985 | Pan |
| 4,538,730 | 9/1985 | Wu |
| 4,549,658 | 10/1985 | Sfikas |
| 4,570,416 | 2/1986 | Shoenfeld |
| 4,640,413 | 2/1987 | Kaplan et al. |
| 4,676,374 | 6/1987 | Wilkins |
| 4,741,475 | 5/1988 | Norman |
| 4,778,047 | 10/1988 | Lay |
| 4,815,600 | 3/1989 | Niles et al. |
| 5,141,252 | 8/1992 | Michlin |
| 5,232,150 | 8/1993 | Solomons |
| 5,269,563 | 12/1993 | Michlin |
| 5,462,160 | 10/1995 | Youngs |
| 5,568,942 | 10/1996 | Stevens |
| 5,570,781 | 11/1996 | Bond et al. |
| 5,590,912 | 1/1997 | Stevens |
| 5,611,426 | 3/1997 | Warfield |
| 5,713,462 | 2/1998 | Hansen |

FOREIGN PATENT DOCUMENTS 656592  7/1986  Switzerland .

*Primary Examiner*—Jacob K. Ackun
*Attorney, Agent, or Firm*—Paul M. Denk

[57] ABSTRACT

A package for holding compact disks includes a box having a front, a back, sides, and a window in the box front, a cover hingedly connected to the box and sized to close the window; a tray received in the box, and a plurality of sleeves received in the tray. The tray includes a bottom, a pair of opposed side members and a pair of opposed end members. The side and end members each including a leg extending upwardly from the tray bottom and a panel extending outwardly from a top edge of the leg. The legs of the end members and side members define a chamber and have a height substantially equal to the height of the sides of the box. The tray having a width and length substantially equal to the width and length of the box. The sleeves have a front and back defining a pocket sized to receive a compact disk, and a mounting strip hingedly connected to the sleeve along a bottom edge of the sleeve for mounting the sleeve to the bottom of the tray. The sleeves have a side-to-side width smaller than the side-to-side width of the box window. Each sleeve is movable between a reclined position in which a top edge of the sleeve is parallel to, or below, the box front and an upright position in which a top edge of the sleeve extends through the box window; the sleeves being moved to the reclined position when the cover is closed.

13 Claims, 3 Drawing Sheets

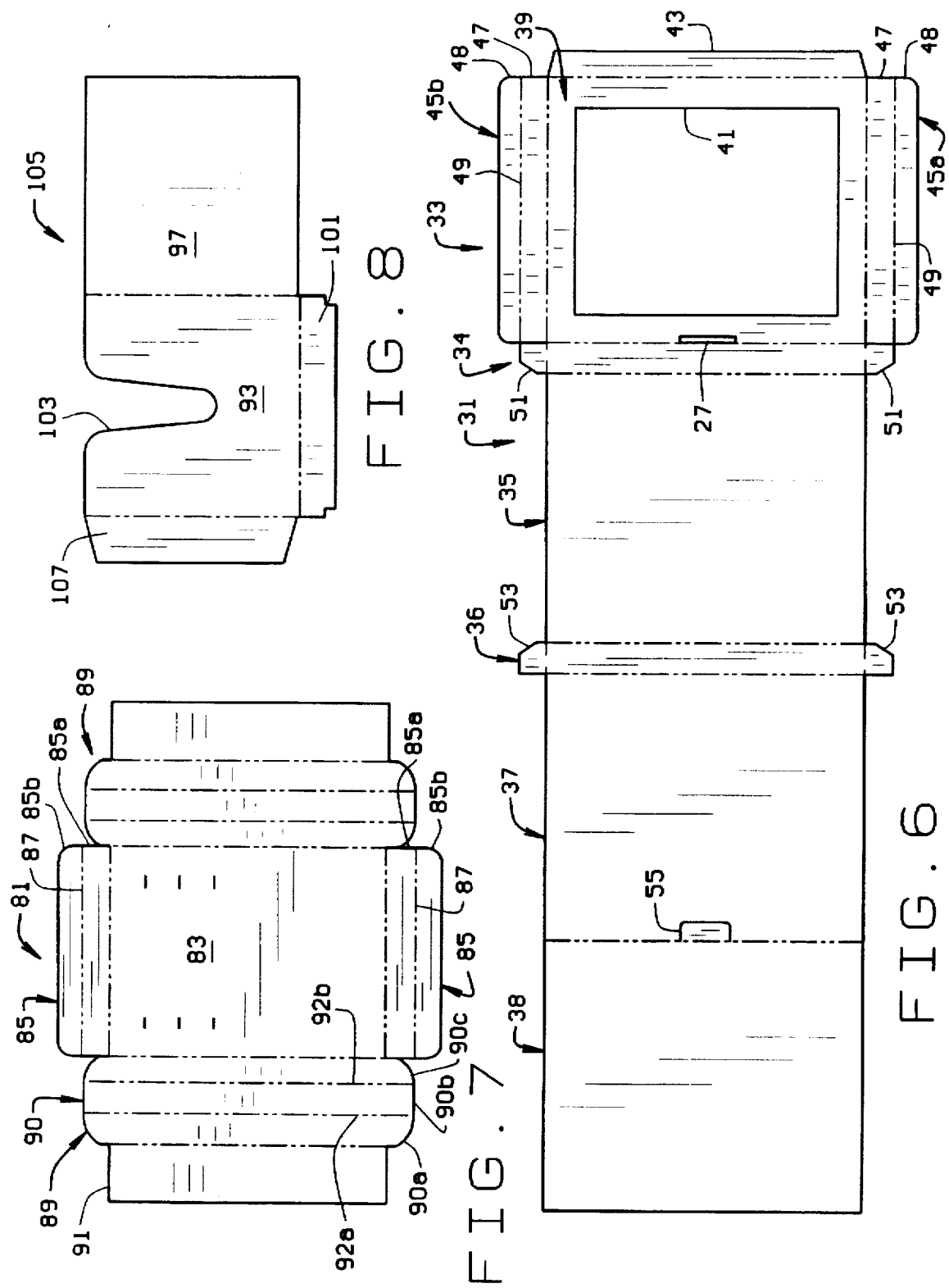

PAPERBOARD COMPACT DISK PACKAGE

BACKGROUND OF THE INVENTION

This application relates to packages for compact disks, and, in particular to a paperboard container which will hold a few (i.e. 3–4) compact disks.

Compact disks are commonly used to hold information such as digitized music or data for computer programs. The disks are often carried by the owner between locations. Portable files and portable holders for compact disks are known and available. However, these holders are often thin and do not allow for easy viewing of the disks. It is therefore more difficult to determine in a quick glance what disks are in the holder.

BRIEF SUMMARY OF THE INVENTION

One object of the present invention is to provide a compact disk holder or package which can hold and transport a plurality of compact disks.

Another object is to provide such a package which is made of paperboard.

A further object is to provide such a package, which when opened, allows for easy viewing of the compact disks held in the package.

Yet another object is to provide such a package in which the compact disks may be easily retrieval from, and inserted into, the package.

These and other objects will become apparent to those skilled in the art in light of the following disclosure and accompanying drawings.

Briefly, a package of the present invention includes a box, a tray received in the box, and a sleeves which are received in the tray. The box and tray are made from paperboard blanks, the blanks being one-piece blanks. The box has a front, a back, sides, and a window in the box front. At least one of the sides of the box is openable so that the tray may be inserted into, or removed from the box.

The tray includes a bottom and side walls which cooperate to define a chamber. The tray walls are formed by two side members and two end members which extend upwardly from the bottom panel. The side members include an inner leg extending upwardly from the tray bottom, a top web extending outwardly from a top edge of the side member inner leg, and an outer leg extending downwardly from an outer edge of the top web. A bottom member or panel is provided on the side members. The side member bottom panels extend inwardly towards the tray bottom from the bottom of the outer leg a distance sufficient to extend under the tray bottom so that the side member bottom panel can be adhered to the tray bottom. The end members including a leg extending upwardly from the tray bottom and a flange extending outwardly from a top edge of the end member legs. As can be appreciated, the periphery of the chamber is defined by the side member inner legs and the end member legs. Preferably, the side members have a length substantially equal to the length of the box and the end members have a length sufficient to extend between the side member. The distance between opposing outer legs of the side members is substantially equal to the width of the box. Thus, the tray has overall dimensions substantially equal to the inner dimensions of the box so that the tray will be snugly received in the box.

The sleeves each have a front and back defining a pocket sized to receive a compact disk, and a mounting tab for mounting the sleeves to the bottom of the tray. The sleeves have a side-to-side width smaller than the side-to-side width of the box window such that the sleeves can extend through the window. The sleeve and mounting strip are hingedly connected so that the sleeve can be moved between a reclined position in which a top edge of the sleeve is parallel to, or below, the box front and an upright position in which a top edge of the sleeve extends through the box window. The hinged connection of the sleeve to the mounting tab has a spring-like quality or a memory which biases the sleeve to the upright position.

A cover which closes the box window is provided to close the window. The cover is movable between a closed position in which the window is closed and an opened position in which the window is opened. The box includes a slot in the front thereof and the cover includes a tab which is received in the slot. The cover tab and the box slot cooperate to maintain the box closed. When the cover is closed, the cover moves the sleeves to their reclined positions and when the cover is opened the sleeves, due to their biasing, move to their upright position.

BRIEF DESCRIPTION OF THE SEVERAL VIEWS OF THE DRAWINGS

FIG. 6 is a plan view of a blank for an outer box of the package;

FIG. 7 is a plan view of a blank for a tray insert of the package; and

FIG. 8 is a plan view of a blank for a compact disk receiving sleeve of the package.

Corresponding reference numerals will be used throughout the several figures of the drawings.

DETAILED DESCRIPTION OF THE INVENTION

Figure 1:
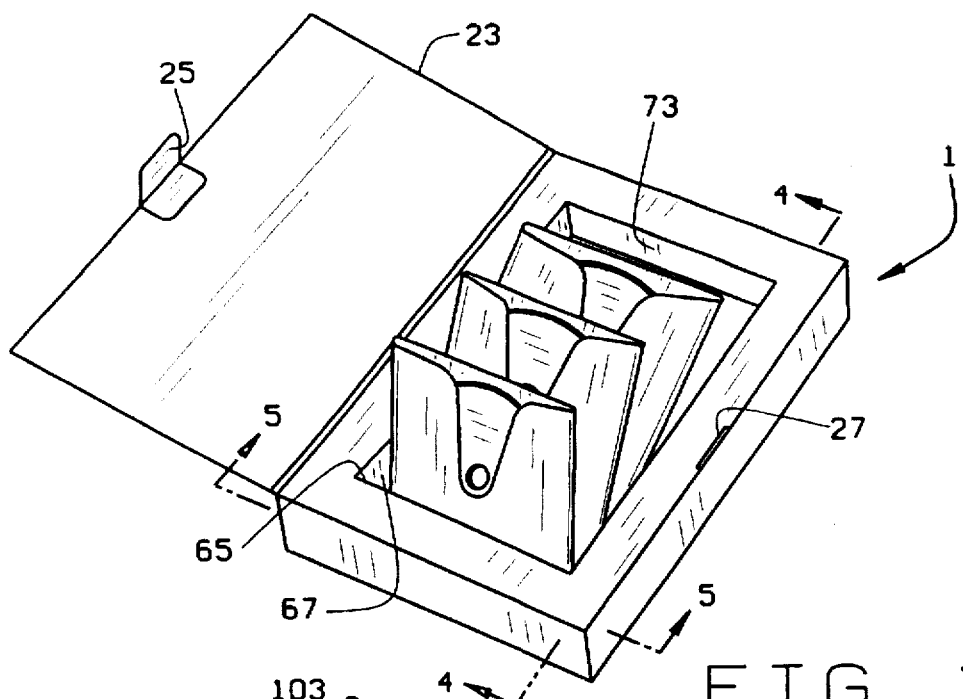
FIG. 1 is a perspective view of a compact disk package of the present invention.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

A package 1 of the present invention includes an outer box 3, a tray insert 5 which is received in the box 3, and a plurality of sleeves 7 which receive compact disks 9 and which are received in the insert 5.

Figure 3:
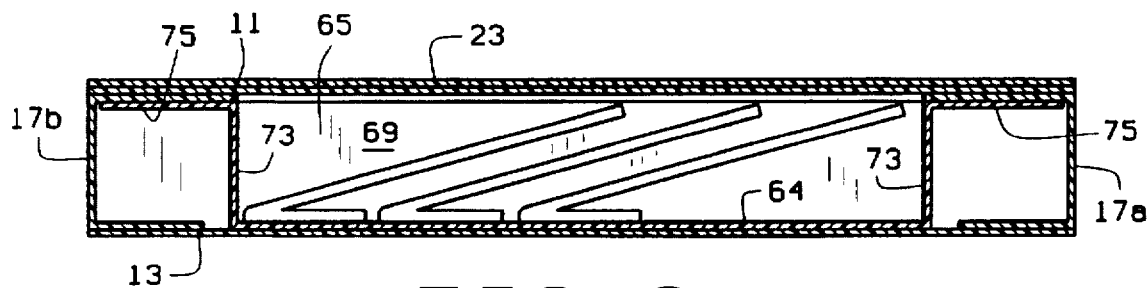
FIG. 3 is a cross-sectional view of the package, taken along line 4—4 of FIG. 1, but with a cover of the package closed.

The box 3 includes a front or top 11, a back or bottom 13, elongate sides 15 and short sides 17a,b. The short side 17b defines a flap 19 which enables the box 3 to be opened and closed to facilitate removal and insertion of the tray 5 into the box. The box front 11 includes a window 21 which is preferably opened. The window 81 has a width slightly greater than the diameter of a compact disk and than the side-to-side width of the sleeves 7, so that the sleeves 7 can extend through the window 21, as seen in FIG. 1. A cover 23 is provided to close the window 21. The cover 23 is sized and shaped to be coextensive with the box front 11 and is preferably a two-ply cover. The cover 23 is hingedly connected to one of the elongate sides 15 and includes a tab 25 on its outer edge opposite the hinge. The tab 25 is received in a slot 27 formed in the front 11 of the box adjacent the edge opposite the cover 23. When the tab 25 is received in the slot 27, the cover 23 will be held in a closed position, such as is seen in FIG. 3.

The blank 31 from which the box 3 is formed is shown in FIG. 6. As can be seen, the blank 31 is a one-piece blank, which is preferably made from paperboard. The blank can be divided into six different sections 33–38. Blank section 33 defines the front 11 and the short sides 17a,b of the box 3; blank section 34 forms one of the sides 15 of the box; blank section 35 forms the bottom 13 bottom of the box; blank section 36 forms the other elongate side 15; and blank sections 37 and 38 form the cover 23 of the box.

The section 33 has a main body or portion 39 which forms the front 11 of the box and has an opening 41 cut therein to define the window 21. A glue tab 43 is hingedly connected to an elongate edge of the section main body 21 opposite the section 34. Closure tabs 45a,b are hingedly connected to the top and bottom (i.e., short edges) of the section main body 39 to form the short sides 17a,b of the box. The closure tabs 45a,b divided into two portions 47,48 by a hinge line 49. In folding the box the portions 47 of the closure tabs 45a,b form the sides 17a,b and the portions 48 are received against the bottom of the box and hold the closure tabs in a closed position, as is known.

The section 34 is hingedly connected to the main body 39 of section 33 along an edge opposite the glue tab 43. Section 34, which defines one of the elongate sides 15 of the box, includes tabs 51 which are hingedly connected to the section 34 at the top and bottom of the section.

Section 35 is hingedly connected to section 34 along a second elongate edge of section 34.

Section 36 is hingedly connected to section 35 along an edge opposite the hinged connection between sections 35 and 34. Section 36 includes tabs 53 at the top and bottom thereof. Tabs 53 are hingedly connected to section 36, and when the blank is folded, form counterparts to the tabs 51 of section 34.

Section 37 is hingedly connected to section 36 and section 38 is hingedly connected to section 37 along a hinge line. Section 37 includes a score 55 which forms the tab 25. The score 55 is formed in section 37 such that one edge of the tab 25 is defined by the hinge line between sections 37 and 38.

As can be seen, the blank is generally a rectangular blank, from which the tabs 51 and 53 and the closure flaps 45a,b extend. To fold the blank, the blank is simply folded along the various fold lines between the sections. An adhesive is applied to glue tab 43 and/or the section 35 (less the tabs 53) so that the section 35 and the glue tab 43 will be adhered together so that the box 3 will maintain its rectangular shape. When the sections 37 and 38 are folded, the section 38 forms a top or outer surface of the cover 23 and the section 37 forms an inner surface of the cover 23. As can be appreciated, the cover is a two-ply cover. However, the cover could be a single ply, if desired. The closure tabs 45a,b and the tabs 51 and 53 are folded, as is known to form the short sides 17a,b of the box 3.

Figure 5:
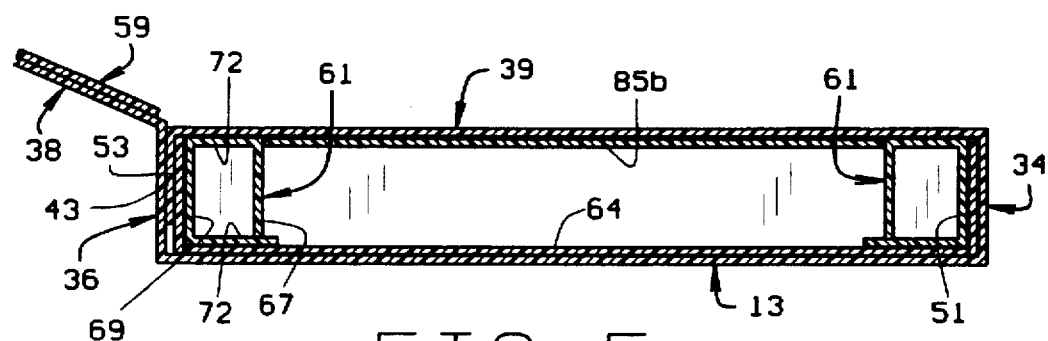
FIG. 5 is a cross-sectional view of the package taken along line 5—5 of FIG. 1 with the cover of the package closed.

The tray 5 includes two side members 61, two end members 63, and a bottom panel 64 which cooperate to define a chamber 65. The members 61 and 63 are sized such that the chamber 65 has an outer perimeter approximately coextensive with the edges of the window 21 in the box front 11. The side members 61 each include an inner leg 67, an outer leg 69, and a top web 71 which extends between the legs 67 and 69. A bottom 72 extends inwardly from the bottom of the outer legs 69. As seen in FIG. 5, the bottom 72 is slightly larger than the top web 71, and thus lies underneath the bottom panel 64. The member bottom panel 70 is glued or otherwise adhered to the tray bottom panel 64 so that the members 61 will retain their quadrilateral shape. The inner legs 67 form two sides of the chamber 65. The end members 63 each have a leg 73 and an upper arm or flange 75. The legs 73 form the remaining two sides of the chamber 65. The side members 61 are approximately as long as the elongate sides 15 of the box 3, and the end members 63 are of a length sufficient to substantially span the distance between the side members 63. The legs 67, 69 and 73 of the members 61 and 63 are sized such that the height of the tray 5 is approximately equal to the top to bottom depth of the box, so that the tray will fit snugly inside of the box.

The blank 81 from which the tray 5 is formed is shown in FIG. 7. The blank 81 includes a main body or portion 83 which defines the bottom panel 64 of the tray 5. The main body 83 of blank 81 is sized to be substantially equal in size and shape to the bottom 13 of the box 3. Flaps 85 are hingedly connected to the main body 83 at the top and bottom thereof. The flaps 85 have a hinge line 87 which divide the flaps into two sections 85a,b which form the leg 73 and flange 75, respectively, of the tray end members 63. The blank 81 also includes side flaps 89 which form the side members 61 of the tray 5. The flaps 89 have two sections 90 and 91. Sections 90 are hingedly connected to the side edges of the main body 83 and section 91 is hingedly connected to the outer edge of section 90. Section 90 forms the top and sides of the side members and section 91 forms the bottom panel 70. Section 90 is divided into three approximately equal sections 90a–c by two hinge lines 92a–b. To form the tray 5 from the blank, the blank 81 the flaps 89 and 85 are folded to form the members 61 and 63, respectively, so that the members 61 and 63 extend above the plane of the main body 83. The flap sections 91 are folded under the side members 61 formed from the flap portions 90 and are adhered to the bottom of the main body 83 so that the side members will retain their shape, as noted above.

Figure 2:
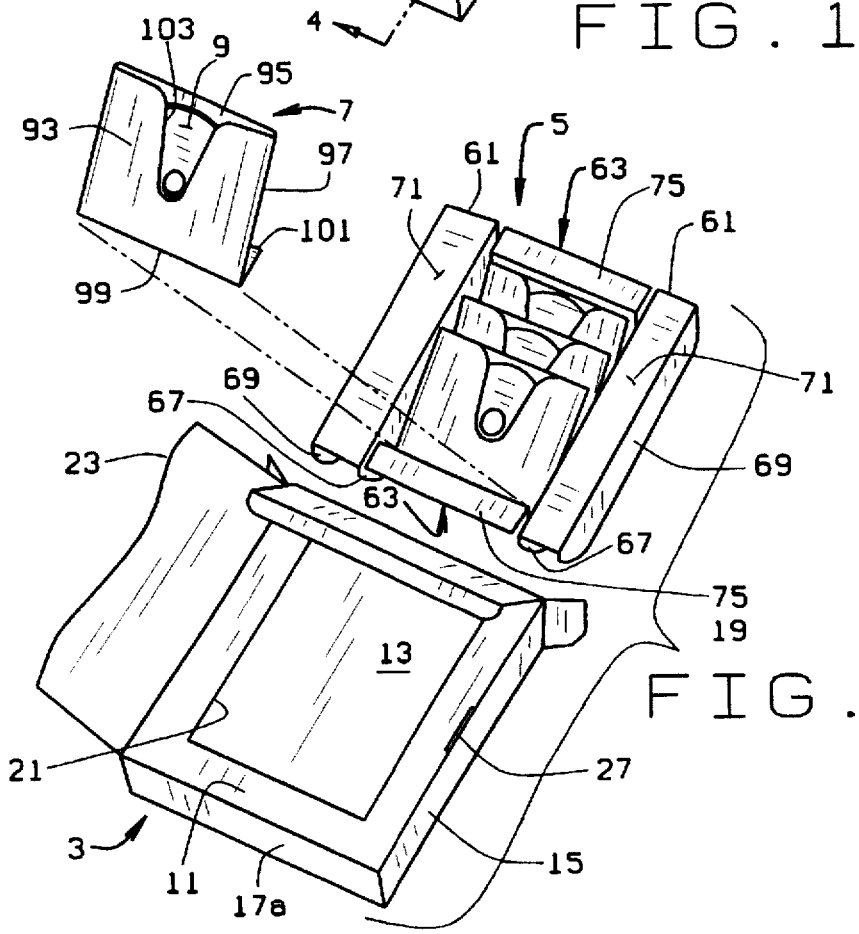
FIG. 2 is an exploded perspective view of the compact disk package.
Figure 4:
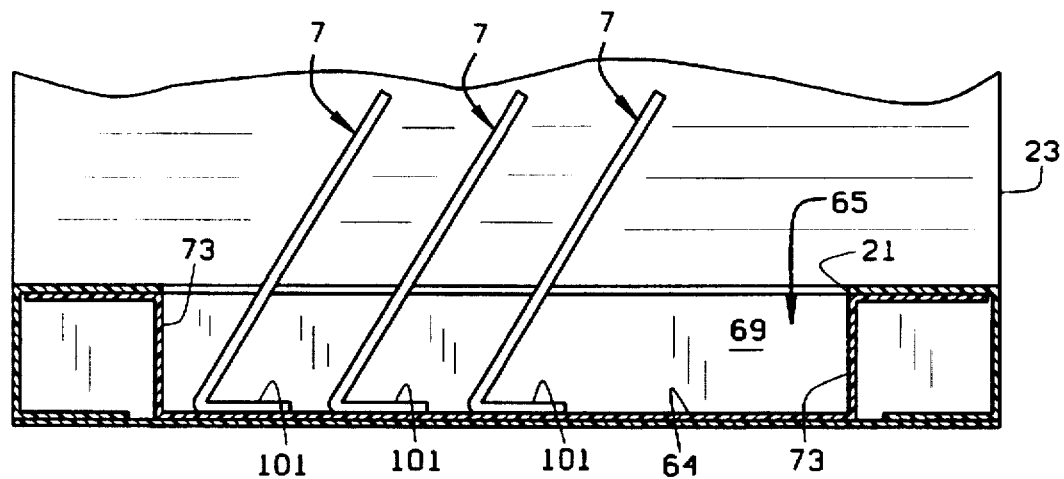
FIG. 4 is a cross-sectional view of the package, taken along line 4—4 of FIG. 1, with the cover of the package opened.

Lastly, the sleeves 7 are mounted in the chamber 65. As seen in FIG. 2, the sleeves 7 include a front panel 93 and a back panel 95 which are joined together along the sides 97 and bottom 99. The sleeves 7 are each sized and shaped to define a pocket or chamber which will receive a single compact disk 9. Preferably, the distance between the edges 97 of the sleeve is less than the width of the window 21 so that the sleeve may extend up through the window when the cover 23 is opened, as seen in FIG. 1. The sleeve includes a mounting tab 101 which extends rearwardly from the bottom edge 99 of the sleeve 7. As seen in FIGS. 3 and 4, the mounting tab 101 is adhered to the bottom panel 64 of the tray chamber 65. The tab 101 is hingedly connected to the bottom edge 99 of the sleeve 7, and includes a memory. Thus, when the cover 23 is closed, the sleeves will lie along an acute angle, as seen in FIG. 3, to be fully contained in the chamber 65. However, when the cover 23 is opened, the memory of the hinge will cause the sleeves 7 to rise, to a position such as seen in FIG. 4, so that the compact disks are easily accessible in the sleeves.

The sleeve front panel 93 has a generally V shaped slot 103 extending downwardly from the top edge of the front panel 93. The slot 103 enables the user to see a portion of the disk so that the user will not have to remove the disk to determine what disks are in the sleeves. The slot 103 also facilitates removal of the compact disks from the sleeves.

The blank 105 from which the sleeve 7 is made is shown in FIG. 8. As can be seen, the blank 105 is a simple one, and has a glue tab 107 on one side of panel 93 which is glued to an inner surface of the panel 97 to form the sleeve 7. The tab 101 extends from the bottom edge of the blank portion which forms the front 93 of the sleeve.

To assemble the compact disk package 1, the box 3 and tray 5 are formed as noted above. The sleeves 7 are then inserted into the tray chamber 65. Preferably, the sleeves 7 are inserted into the tray chamber 65 prior to the tray 5 being inserted into the box 3. The sleeves are spaced apart a sufficient distance so that at least some of each compact disk in the package 1 is visible through the slot 103 of each sleeve. The length of the package (i.e., between the end members 63 of the tray 5) is sufficient to hold three to four compact disks. The package could be longer or shorter if desired.

As will be appreciated, the package 1 is simple to form and allows for easy access to the compact disks held therein. When the cover is opened, the sleeves 7 spring upwardly slightly through the window 21 to facilitate viewing and retrieval of the compact disks held therein. When the disks are to be returned to the sleeve, the fact that the sleeves 7 are accessible through the window facilitates returning of the disk to the package. Thus, the tray 5 need not be removed from the box 3 to retrieve disks from, or return disks to, the box 3. When the cover 23 is closed, the act of closing the cover will cause the sleeves to pivot about the hinge line at the base of the sleeves to the position shown in FIG. 3. Thus, there is no need to push the sleeves 7 into the chamber 65 when closing the package 1. The interaction of the cover tab 25 with the slot 27 in the box front 11 is sufficiently strong to maintain the package 1 closed.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. For example, although the side and end members of the tray meet in a box-like connection, the junction between the side and end members could be mitered. This example is only illustrative.

I claim:

1. A package for holding compact disks, the package including:

a box having a front, a back, sides, and a window in the box front; at least one of the sides being openable;

a tray received in the box; the tray including a bottom and side walls which cooperate to define a chamber; and a plurality of sleeves received in the tray, the sleeves having a front and back defining a pocket sized to receive a compact disk; the sleeve having a side-to-side width smaller than the side-to-side width of the box window; each sleeve including a mounting strip along a bottom edge of the sleeve for mounting the sleeve in the tray; each sleeve being hingedly connected to the mounting to be movable between a reclined position in which a top edge of the sleeve is parallel to, or below, the box front and an upright position in which a top edge of the sleeve extends through the box window.

2. The package of claim 1 including a cover which closes the box window.

3. The package of claim 1 wherein the box includes a slot in the front thereof and the cover includes a tab which is received in the slot, the cover tab and the box slot cooperating to maintain the box closed.

4. The package of claim 1 wherein the box and tray are made from paperboard blanks, the blanks being one-piece blanks.

5. The package of claim 1 wherein the tray wall includes two side members and two end members which extend upwardly from the bottom panel; the side members including an inner leg extending upwardly from the tray bottom, a top web extending outwardly from a top edge of the side member inner leg, and an outer leg extending downwardly from an outer edge of the top web; the end members including a leg extending upwardly from the tray bottom and a flange extending outwardly from a top edge of the end member legs.

6. The package of claim 5 wherein the tray side members include a bottom extending inwardly towards the tray bottom from the bottom of the outer legs.

7. The package of claim 6 wherein the side member bottoms extend beneath the tray bottom, the side member bottoms being adhered to the tray member bottom.

8. The package of claim 5 wherein the side member inner legs and the end member legs define the periphery of the tray chamber.

9. The package of claim 5 wherein the tray side members have a length substantially equal to the length of the box, and the tray end members have a length substantially equal to the distance between the side member inner legs.

10. The package of claim 9 wherein the tray has a length and width substantially equal to the length and width of the box to be snugly received in the box.

11. The package of claim 10 wherein the tray has a height substantially equal to the height of the box between the box front and box bottom.

12. A package for holding compact disks, the package including:

a box having a front, a back, sides, and a window in the box front; at least one of the sides being openable;

a cover hingedly connected to the box and sized to close the window, the cover being movable between a closed position in which the window is closed and an opened position in which the window is opened;

a tray received in the box; the tray including a bottom, a pair of opposed side members and a pair of opposed end members; said side and end members each including a leg extending upwardly from the tray bottom and a panel extending outwardly from a top edge of the leg; the legs of the end members and side members defining a chamber; the legs of the end members and side members having a height substantially equal to the height of the sides of the box; the tray having a width and length substantially equal to the width and length of the box; and a plurality of sleeves received in the tray, the sleeves having a front and back defining a pocket sized to receive a compact disk, and a mounting strip hingedly connected to the sleeve along a bottom edge of the sleeve for mounting the sleeve to the bottom of the tray; the sleeves having a side-to-side width smaller than the side-to-side width of the box window; each sleeve being movable between a reclined position in which a top edge of the sleeve is parallel to, or below, the box front and an upright position in which a top edge of the sleeve extends through the box window; the sleeves being moved to the reclined position when the cover is closed.

13. The package of claim 12 wherein the hinged connection between the sleeve and the sleeve mounting strip has a spring-like quality, the sleeves automatically moving to the upright position when the cover is moved to its opened position.

* * * * *